United States Patent [19]
Stouffer et al.

[11] Patent Number: 5,670,606
[45] Date of Patent: Sep. 23, 1997

[54] CRYSTALLINE FORM OF POLY(ETHYLENE 2,6-NAPHTHALATE) AND A METHOD FOR ITS PRODUCTION

[75] Inventors: Jan M. Stouffer, Hockessin; Elwood Neal Blanchard, Wilmington, both of Del.; Kenneth Wayne Leffew, Kennett Square, Pa.

[73] Assignee: E. I. Du Pont de Nemours and Compant, Wilmington, Del.

[21] Appl. No.: 583,365

[22] Filed: Jan. 5, 1996

[51] Int. Cl.[6] .................................................. C08G 63/02
[52] U.S. Cl. ........................................... 528/272; 528/182
[58] Field of Search ........................... 528/182, 272, 528/298, 483, 502, 503, 308

[56] References Cited

U.S. PATENT DOCUMENTS

| | | | |
|---|---|---|---|
| 4,963,644 | 10/1990 | Duh | 528/272 |
| 5,331,082 | 7/1994 | Mossman et al. | 528/298 |
| 5,391,694 | 2/1995 | Duh et al. | 528/272 |
| 5,449,701 | 9/1995 | Duh | 521/182 |

FOREIGN PATENT DOCUMENTS 61-78863  4/1986  Japan ........................... C08L 67/02

OTHER PUBLICATIONS

Shijie, Q. et al., *Polymeric Materials Science and Engineering*, 6(5), 32–36 (1990).

Jumu, Z. et al., *Sichuan Daxue Zuebao* (Journal of Sichuan Univ.), 2, 58–62 (1986).

Kimura, M. et al, *Reports on Progress in Polymer Physics in Japan*, vol. XXII, 219–222 (1979).

*Primary Examiner*—Terressa Mosley

[57] ABSTRACT

Disclosed herein is a novel crystalline form of low molecular weight poly(ethylene 2,6-naphthalate). This crystalline form may be produced from molten or glassy low molecular weight poly(ethylene 2,6-naphthalate) material by means of rapid heat transfer to or from the material. The poly(ethylene 2,6-naphthalate) composition is suitable for use as a starting material for solid-state polymerization in order to produce polymers of higher molecular weight.

26 Claims, 3 Drawing Sheets

FIG.2

CRYSTALLINE FORM OF POLY(ETHYLENE 2,6-NAPHTHALATE) AND A METHOD FOR ITS PRODUCTION

FIELD OF THE INVENTION

This invention concerns an improved process for producing low molecular weight poly(ethylene 2,6-naphthalate) and its use in solid-state polymerization to obtain a higher molecular weight polymer. A novel crystalline form of poly(ethylene 2,6-naphthalate) is also disclosed.

TECHNICAL BACKGROUND

Poly(ethylene 2,6-naphthalate), herein abbreviated PEN, is useful in many materials and products, such as films, industrial fibers, containers and packaging. Films made from PEN, for example, have been found superior to films made from poly(ethylene terephthalate), herein abbreviated PET, because films made from PEN exhibit improved tensile properties, hydrolytic stability and barrier properties.

Most of the uses for PEN require a polymer of relatively high molecular weight. Such polymers have been commercially made by raising, either in melt or solid-state polymerization, the molecular weight of a low molecular weight polymer, sometimes referred to as a prepolymer or oligomer. Melt polymerization of PEN to reach high molecular weights, however, is more difficult than PET for a number of reasons. The melt viscosity of PEN at a given inherent viscosity (I.V.) is much higher than PET, making it more difficult to process. Typically, PEN is melt polymerized to an I.V. ranging from about 0.50 to 0.70, and then, if higher IV's are desired, is solid-state polymerized.

An additional problem associated with the melt polymerization of PEN is that color development in the melt phase is very rapid. Degradation products are formed in the melt that can produce color formation in the final polymer. Degradation products such as DEG (diethylene glycol) can also lower the physical properties of the final product.

In general, melt polymerizations require higher temperatures, which are more likely to cause polymer decomposition and require expensive equipment. Solid-state polymerizations, in contrast, are usually run at somewhat lower temperatures. Solid-state polymerizations also have the advantage, compared to melt polymerizations, that very high molecular weights, where melt viscosities would otherwise be extremely high, can be more readily obtained. In commercial use, however, solid-state polymerizations may be relatively slow. U.S. Pat. Nos. 4,963,644; 5,449,701; 5,331,082; and 5,391,694 describe various aspects of solid-state polymerization and/or the preparation of PEN for use in solid-state polymerization.

Solid-state polymerization of PEN is also more difficult than for PET. Solid-state polymerizations usually require that lower molecular weight amorphous polymer, in the form of particles or pellets, undergo a relatively lengthy crystallization process prior to being polymerized in the solid-state. The crystallization process is usually accomplished by heating the lower molecular weight polymer to a temperature above the glass transition temperature, $T_g$, but below the melting point, $T_m$, of the polymer.

PEN, however, cannot be easily crystallized in the conventional manner. PEN crystallizes at a much slower rate and at a higher temperature than PET, adding expense and difficulty. Furthermore, during the crystallization process, low molecular weight PEN particles release volatile products which can produce "popcorn-like" particles if the crystallization is not preceded by a devolatilization step. See, e.g., U.S. Pat. No. 4,963,644.

In view of the above, new and improved methods for polymerizing PEN are desired.

Q. Shijie and Z. Guien, Gaofenzi Cailiao Kexue Yu Gongcheng, *Polymeric Materials Science and Engineering*, vol. 6, no. 5, pp. 32–36 (1990); Z. Jumu et al., *Sichuan Daxue Xuebao* (Journal of Sichuan University), no. 2, pp. 58–62 (1986); and Japanese Kokai Sho 61 [1986]-78863 all report on the properties, particularly the crystalline properties, of various PEN polymers. None of these references disclose or teach the novel crystalline form of PEN, and its associated properties, produced by the present process and claimed herein.

SUMMARY OF THE INVENTION

This invention concerns a composition comprising, poly(ethylene 2,6-naphthalate) having an average apparent crystallite size of at least 10.0 nm determined from the $\bar{1}10$ reflection.

This invention also concerns a process for crystallizing poly(ethylene 2,6-naphthalate), comprising cooling at a rate sufficient to lower the temperature of a molten poly(ethylene 2,6-naphthalate) mass or, alternatively, heating at a rate sufficient to increase the temperature of a glassy poly(ethylene 2,6-naphthalate) mass to a temperature of about 130° C. to about 250° C. to produce a crystalline poly(ethylene 2,6-naphthalate) having an average apparent crystallite size of 10.0 nm or more determined from the $\bar{1}10$ reflection. More particularly, disclosed herein is a process for the crystallization of pellets of poly(ethylene 2,6-naphthalate), comprising:

heating a glassy poly(ethylene 2,6-naphthalate) mass to a bulk average temperature within the range of 130° C. to about 250° C. within a specified maximum period of time and, furthermore, maintaining the mass at that bulk average temperature for a specified minimum period of time; or cooling a molten mass of poly(ethylene 2,6-naphthalate) so that the bulk average temperature of the droplets or crystallizing pellets is brought to a temperature within the range of 130° C. to about 250° C. within a specified maximum period of time and, furthermore, maintaining the crystallizing pellets at that bulk average temperature for a specified minimum period of time.

In a preferred embodiment, the glassy mass may be in the form of particles or pellets or the molten mass may be in the form of small portions or droplets.

This invention also concerns a process for the solid-state polymerization of poly(ethylene 2,6-naphthalate), wherein the improvement comprises starting with a poly(ethylene 2,6-naphthalate) having an average apparent crystallite size of 10.0 um or more, determined from the $\bar{1}10$ reflection, a degree of polymerization (DP) of at least 4 and an inherent viscosity (I.V.) of less than about 0.4 dl/g. Finally, a PEN polymer product of a solid-state polymerization process is disclosed which product has an average apparent crystallite size of 10.0 nm or more, as determined from the $\bar{1}10$ reflection, and an inherent viscosity (I.V.) of at least about 0.5 dl/g.

DETAILS OF THE INVENTION

A novel process for making of poly(ethylene 2,6-naphthalate), also referred to as PEN, is disclosed herein. A novel composition of PEN characterized by a certain kind of crystalline morphology and other desirable characteristics is also disclosed. By PEN or poly(ethylene 2,6-naphthalate) herein is meant poly(ethylene 2,6-naphthalate) that may be modified with small amounts, less than 10 mole percent, and more preferably less than 5 mole percent of the polymer repeat units, of copolymerized monomers (or "co-repeat units"), so long as the crystallization behavior of the polyester is substantially the same as "homopolymer" PEN.

The present PEN has an average apparent crystallite size of about 10.0 nm or more, preferably 11.0 nm or more, more preferably about 12.0 nm or more, and especially preferably about 13.0 nm or more as determined from the $\bar{1}10$ reflection. The average apparent crystallite size is measured by wide-angle X-ray powder diffraction, the method or procedure for which is as follows.

Figure 1:
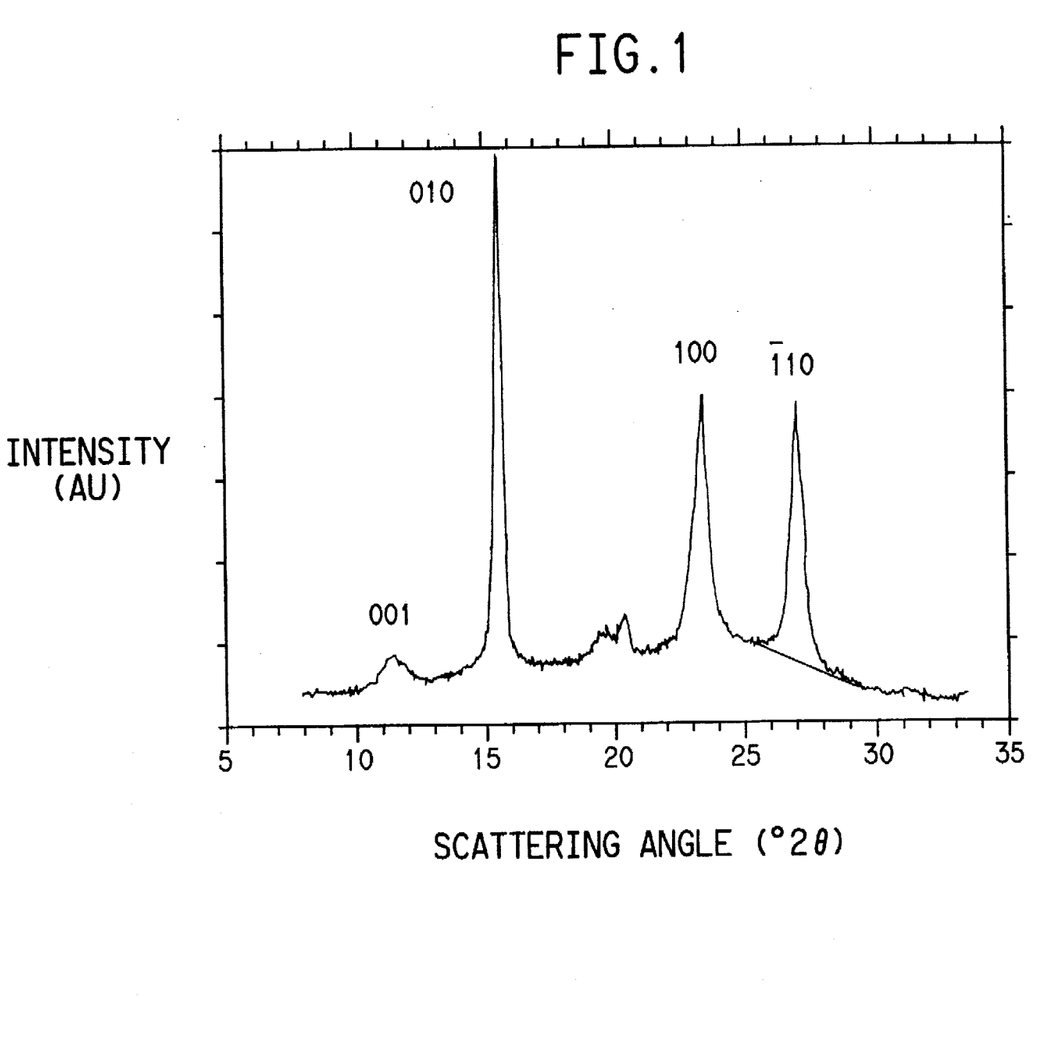
FIG. 1 is an illustration of a wide-angle X-ray diffraction pattern of a sample of PEN polymer produced according to the present invention.
Figure 2:
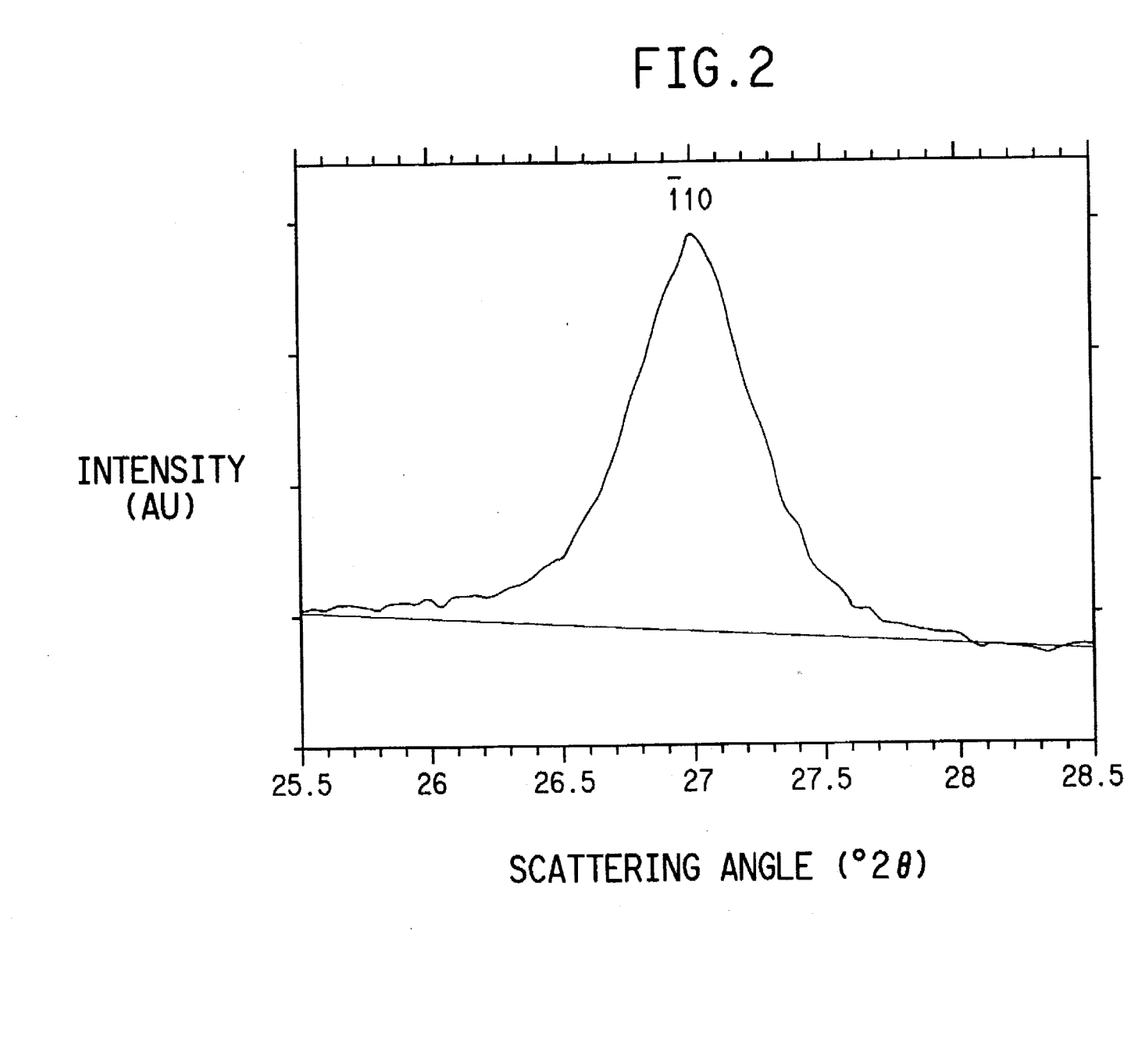
FIG. 2 is an illustration of the region of interest of the diffraction pattern shown in FIG. 1.

Polymer samples of PEN having uniform thickness for X-ray measurements are produced by cryogrinding the PEN in a SPEX Freezer/Mill (Metuchen, N.J.) under liquid nitrogen for 30 seconds and then compressing the PEN into disks approximately 1 mm thick and 32 mm in diameter. While it is preferable that the sample's patterns are collected over the range 25.5°–28.5° $\theta$2 (as shown in FIG. 2), the patterns of the samples can be collected over the range 5°–35° $2\theta$ in some cases, as was obtained for some of the samples (as shown in FIG. 1). The diffraction data are collected using an automated Philips diffractometer operating in the transmission mode (CuK$\alpha$ radiation, curved diffracted beam monochrometer, fixed step mode (0.05°/step), 65 sec/step, 1° slits, sample rotating). Lorentz-polarization corrections are applied to each powder pattern.

To remove the local background scattering from the 25.5°–28.5° $2\theta$ region of each powder pattern, a straight line extending from 25.5° to 28.5° $2\theta$ is defined and subtracted, as shown in FIG. 2. This region of the diffraction pattern has been found to contain a crystalline reflection at approximately 27.0° $2\theta$, that has been defined as the $\bar{1}10$ reflection by Mencik, Z., Chem. Prum., vol. 17, no. 2, p. 78 (1976).

FIGS. 1 and 2 show the diffraction patterns, corrected as detailed above, collected over the $2\theta$ range 5°–35° and 25.5–28.5°, respectively. In addition to the Miller indices of the reflection of interest, the local "artificial" background between 25.5° and 28.5° $2\theta$, labeled "b", and described above, is shown.

Figure 3:
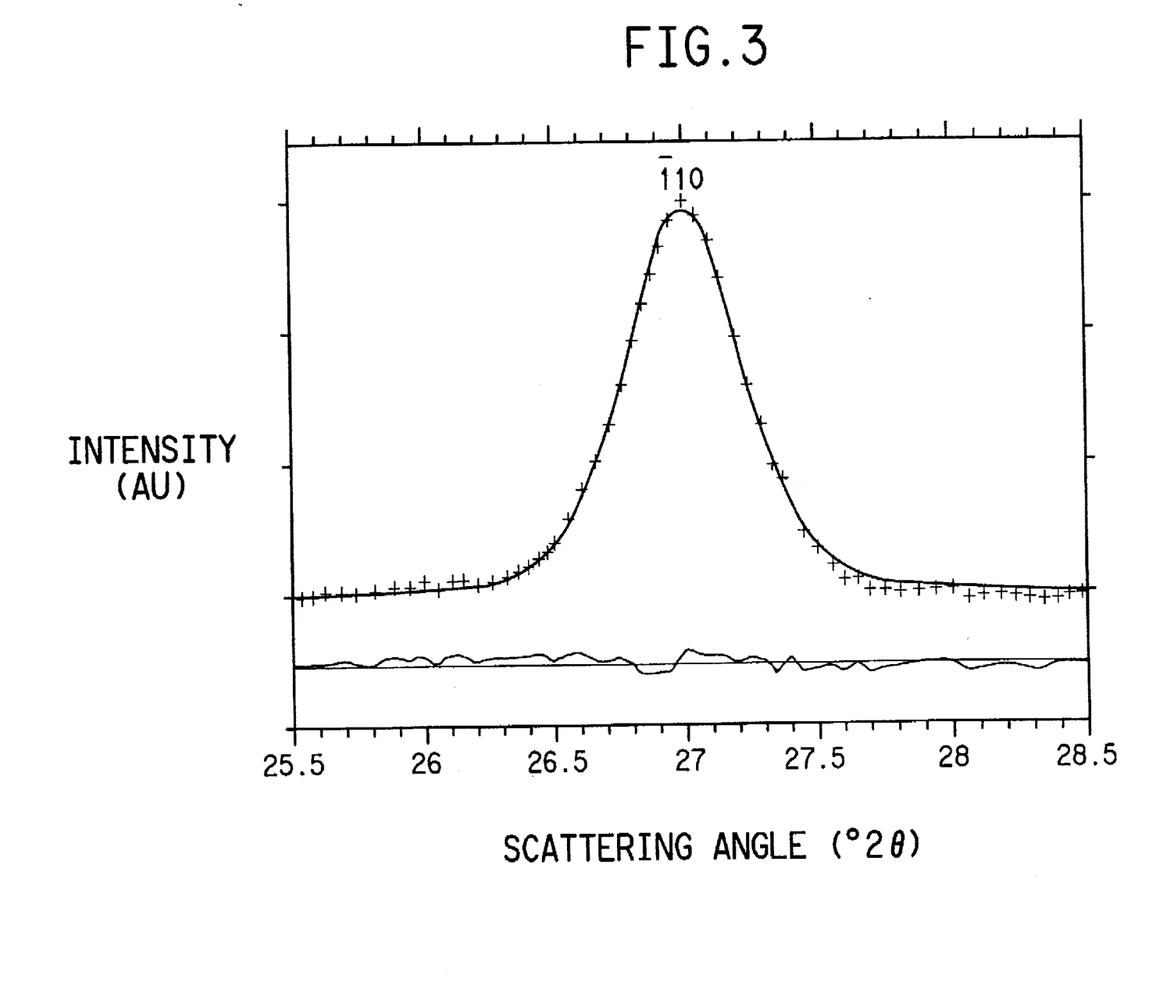
FIG. 3 is an illustration of the wide-angle X-ray diffraction pattern of FIG. 2 after being deconvoluted into a Pearson VII peak.

The 25.5°–28.5° region is then deconvoluted into a Pearson VII peak corresponding to the crystalline reflection, and the position, width, height, and exponential Pearson VII fitting parameter of the peak is extracted. See Equation 2.3.3.16 on page 67 from the standard reference by A. J. C. Wilson, ed., *International Tables For Crystallography*, Vol. C, published for The International Union of Crystallography by Kluwer Academic Publishers, Dordrecht (1992). An example of this deconvolution is shown in FIG. 3. Below the deconvoluted peak is plotted the residuals, i.e., the observed minus calculated intensity as a function of angle. The apparent crystallite size for the $\bar{1}10$ reflection (herein sometimes also referred to simply as apparent crystallite size), $ACS_T10$, is calculated from the reflection's position and full width at half height using the Scherrer equation, as for instance described by L. E. Alexander, *X-Ray Diffraction Methods in Polymer Science*, p. 335 et seq. (John Wiley & Sons, New York, 1969):

$$ACS_{\bar{1}10} = \frac{K\lambda}{\beta_{\bar{1}10}\cos\theta_{\bar{1}10}}$$

where $ACS_T10$ is the mean dimension of the crystal, K is assumed to be 1.0, $\lambda$ is the wavelength, $\beta$ is the full width at half height of the profile, in radians, and $\theta$ has its normal meaning.

By the term "average" with respect to apparent crystallite size is meant the numerical average of one or more (preferably 3 or more) measurements on the same batch of polymer. Such multiple measurements may be used to insure reproducibility because of the relatively small sample size used in the x-ray measurement.

It is also preferred if the PEN has no distinct premelting endotherm. By a "premelting endotherm" is meant an endothermic peak in the DSC trace due to a melting endotherm at a lower temperature than (before) the main melting endotherm. By "distinct" is meant the melting occurs over a temperature range of 70° C. or less, preferably less than 50° C. By having "no distinct premelting endotherm" is meant that if one or more such endotherms are detected, the total heat of fusion is less than 1 J/g, preferably less than 0.5 J/g. Premelting endotherms are believed to be indicative of small and/or relatively imperfect crystallites, and when present, the PEN particle may have a tendency to more readily stick to other particles when heated, usually at or around the temperature of a premelting endotherm, which is very undesirable in solid-state polymerization.

The PEN of the present invention, as a starting material for solid-state polymerization of poly(ethylene 2,6-naphthalate) has an average apparent crystallite size of 10.0 nm or more, determined from the $\bar{1}10$ reflection, degree of polymerization (DP) of at least 4, preferably at least 5, and an inherent viscosity (I.V.) of less than about 0.4 dl/g, preferably less than about 0.3 dl/g. Finally, a PEN polymer product of a solid-state polymerization process is disclosed which product has an average apparent crystallite size of 10.0 um or more, as determined from the $\bar{1}10$ reflection, an inherent viscosity (I.V.) of at least 0.5, preferably about 0.6 to 2.0 dl/g. Inherent viscosity (I.V.) is used to determine molecular weight (specifically, a viscosity average weight $M_v$) over most of the range of interest for PEN. DP as determined by NMR end-group analysis is used to determine the molecular weight (specifically, the number average molecular weight $M_n$) at the lower end of the PEN molecular weight range because of the lower reliability of I.V. at very low molecular weights. Measurements of DP at the higher end of the PEN molecular weight range, as determined from NMR, cannot be made because of the low signal to noise ratio of the PEN end groups. By "degree of polymerization" or DP is meant a statistical average, since such polymeric or oligomeric molecules usually have a distribution of molecular weights.

The PEN of the present invention may be made by rapidly heating glassy PEN to a certain temperature range or by cooling molten PEN to that same temperature range. By a "glassy PEN" is meant a PEN below its $T_g$ that contains less than about 10 weight percent crystalline PEN, preferably less than about 5 weight percent, most preferably less than 1 weight percent. The amount of crystalline PEN present can be determined by standard methods using DSC to determine the heat of fusion of the crystallites present and comparing that with the heat of fusion of "pure" crystalline PEN. By a "molten PEN" is meant a PEN in the liquid (not glassy) state. Preferably it contains less than 10%, more preferably less than 5%, and most preferably less than 1.0% by weight crystalline PEN. It is preferred if the initial temperature of the molten PEN is about 290° C. or higher, preferably about 300° C. or higher, since this is approximately at or above the common melting point of PEN. In order to obtain a large average apparent crystallite size, it is preferred to have as little crystallinity in the starting PEN as possible.

It has been found that the desired PEN crystalline morphology may be formed by rapidly heating or cooling amorphous PEN to a preselected temperature range, which process step may be referred to as thermal shock crystallization. A temperature range of 130° C. to about 250° C., preferably about 140° C. to about 230° C., has been found to produce the desired result. The preferred temperature range may depend on the molecular weight or DP or the PEN being crystallized. For example, PEN having a DP of 6 (I.V. of 0.12) has a preferred range of 130 to 230° C., while PEN having an I.V. of 0.4 has a preferred range of 170 to 250° C. This range, in each case, is centered on the point of maximum rate of crystallization or $T_c$. See S. Buchner et al., "Kinetics of Crystallization and Melting Behavior of Polyethylene Naphthalene-2,6-Dicarboxylate," *Polymer*, 1989, vol. 30, March on pp. 480–487.

Accordingly, in this process, not only must a temperature gradient be imposed between the PEN and its surroundings, but heat (or another appropriate form of energy) should be removed or added to the polymer at a relatively high rate. If heating, conductive and/or radiant heat as obtained in conventional ovens may be employed. For example, ovens in which heat flows primarily by radiation and/or conduction, from the surroundings, into the PEN material or particle may be employed.

This requires that the surroundings or environment of the PEN be able to transfer this heat rapidly. Preferably, the cross-sectional area of the PEN should not be so large that the change of temperature of the PEN is relatively rapid on the surface but inadequate or too slow in the center.

When crystallizing from molten PEN, then in order to obtain rapid heat transfer into the molten PEN, it is preferred if the PEN is in good contact with a heat-transfer material that has a relatively high overall heat capacity (derived from both its mass and its actual heat capacity) and thermal conductance. Metals are particularly useful for this purpose, especially metals with high coefficients of heat transfer. However, coated metals, plastics and other materials may be employed for transferring heat to molten PEN during crystallization.

The surface of the molten PEN may be exposed to a combination of heat transfer materials, for example, a part of the surface may be exposed to a metal surface and another part of the surface may be exposed to, for example, a gas. Although a gas may be used to transfer heat to or from the PEN, the heat capacities of gases are relatively low, and so such cooling would be more difficult to achieve by itself. Liquids at the appropriate temperature may also be used, but may be less preferred because of concerns that contamination may occur and because of the need to separate the liquid from the PEN. Thus, it is preferred to at least partially cool the molten PEN by contact with a heat conductive solid.

Conversely, when starting with glassy PEN instead of molten PEN, the glassy PEN should be rapidly heated instead of cooled. One way to accomplish this is to expose the glassy PEN to a very high temperature environment, about 300° C. to 800° C. or higher for up to about 120 seconds. Generally speaking, the higher the temperature or the smaller the cross section of the PEN being treated, the less time that will be needed. In forming the desired crystalline form of PEN by heating or cooling, it is preferred that the entire crystallization process, i.e., heating or cooling and crystal formation, be complete in less than 5 min, more preferably less than 3 min, more preferably less than 2 min, and most preferably about 3 to about 60 sec. When crystallizing molten PEN, the particles may be maintained at the temperature of crystallization for longer periods of time. When crystallizing glassy PEN, however, prolonged exposure to the temperature of crystallization may be detrimental to the desired result.

The maximum linear distance from any point in a particle to its surface is important in determining how fast the bulk of the PEN is heated or cooled. Generally speaking, it is preferred if the maximum linear distance for the PEN particles to be heated or cooled is about 1 cm or less, more preferably about 0.6 cm or less.

The shape of the crystallized PEN may vary, and may be a film, ribbon, particles of various shapes, etc. In one preferred embodiment, the PEN is in the form of particles (or, more accurately, small discrete traits, masses, or droplets in the case of molten PEN). Crystalline PEN in the form of particles is particularly useful in solid-state polymerization. In general, particles or pellets preferably have an average diameter of 0.05 cm (500 µm) to 2cm. Preferred forms and/or sizes for particles are spherical particles with diameters of 0.05 cm to 0.3 cm, semispherical or hemispherical particles with a diameter of 0.1 cm to 0.6 cm, or right circular cylinders with a diameter of 0.05 cm to 0.3 cm and a length of 0.1 cm to 0.6 cm. If shapes such as films or ribbons are formed, then if desired, they can be later ground, cut, or otherwise divided into particles, such as are suitable for solid-state polymerization. Since it is preferred if the pellets are produced on an economically advantageous commercial scale, the pellets would preferably be produced and collected together in commercial quantities of greater than 10 kg, more preferably greater than 50 kg. The pellets may be used in the same plant soon after being made, stored for later use, or packaged for transport, all in commercial quantities.

Before reaching a stable shape, molten or crystallizing PEN may be affected by the shape of the means into which it can flow or within which it is confined before solidification, whether such means employs physical or other forces.

Glassy PEN, for use as a starting material in a crystallization process according to a method of the present invention, may be made by very rapidly cooling the appropriate molecular weight molten PEN to below the glass transition temperature of PEN. This can be done in bulk or while forming particles of the PEN. The PEN itself can be made from appropriate methods known to the artisan. For methods of polymerizing such polyesters, see, for instance, B. Elvers, et at., Ed., *Ullmann's Encyclopedia of Industrial Chemisty*, Vol. A21, p. 232–237 (VCH Verlagsgesellschaft mbH, Weinheim, 1992). Processes for obtaining PET polymers are applicable to PEN to some extent. Such a glassy polymer may be stored or shipped (preferably in a relatively dry state) for later polymerization to higher molecular weight, whether a solid-state polymerization, melt polymerization, or other processing.

In an integrated plant for producing PEN from monomeric materials, low molecular weight PEN will usually be available as a molten material. Thus, it is preferred if the instant process starts with molten PEN, which is then cooled. It is convenient, and therefore preferred, if the PEN is formed into "particles" just before or essentially simultaneously with the cooling of the molten PEN to form the desired crystalline morphology. The preferred eventual sizes and shapes of such particles are as given above.

The molten PEN may be formed into particles (or, if molten, perhaps more accurately "portions" or "droplets" of PEN) by a variety of methods, including pastillation, (see, for example, U.S. Pat. No. 5,340,509 or copending commonly assigned applications U.S. Ser. No. 08/376,599 and U.S. Pat. No. 5,540,086, both of which applications are hereby incorporated by reference in their entirety), prilling as described in numerous patents such as U.S. Pat. No. 4,165,420, melt cutting, dripping (see Example 1 below), or extruding.

Pastillation, broadly termed, is employed for particle formation in a preferred embodiment of the present invention. Pastillation typically employs an outer, rotating, cylindrical container having a plurality of orifices circumferentially spaced on its periphery. Within the outer container is an inner, coaxial, cylindrical container having a metering bar or channel. The plurality of orifices on the outer container are disposed such that they will cyclically align with the meteting bar or channel on the inner container when the outer container is rotated.

Typically, molten polyester is transferred to the inner container of the pastillator and, under pressure, is dispensed onto a surface such as a conveyor belt in uniform amounts, forming droplets or unsolidified pellets, as each of the plurality of orifices on the outer container align with the meteting bar on the inner container. Pastillators are commercially available, e.g., the ROTOFORMER® pastillator manufactured by Sandvik Process Systems (Totowa, N.J.). For more details on forming polyester particles by pastillation, see copending, commonly assigned and concurrently filed application Ser. No.: 08/376,599. Conventional kinds of rotoformers may be modified and adapted for use in a process according to the present invention.

The PEN portions or particles can be conveniently cooled by contacting them with a metal surface, preferably in a controlled temperature environment, such as a conveyor belt or moving table held at the proper temperature to achieve the desired crystalline morphology. It is preferred that the PEN initially contacts this metal while still largely molten, since contact with a liquid will usually provide better heat transfer than with a solid of the same material. A regulated flow of an inert gas may be passed over the particles to increase the overall rate of cooling.

The temperature to which the PEN mass (or pellet) is brought, referred to above, is the bulk average temperature, defined as the average temperature of the mass (or pellet) or the average of the temperature in every location of the mass (or pellet). To determine the bulk average temperature of pellets, for example, the measurement of bulk average can proceed as follows. Quickly collect a sample of the pellets from the solid surface or gas, whichever is used to thermally shock the pellets. Immediately place the pellets in an insulated container, preferably evacuated. Preferably, the pellets nearly fill the container. Insert a thermocouple. Allow the container to come to an equilibrium temperature and record it as the bulk average temperature.

Alternately, a bulk average temperature of pellets being processed can be calculated as follows. Collect a sample of the pellets. Immediately place the pellets in a preweighed amount of distilled water, at a known temperature, in a preweighed insulated container. Reweigh the total mass. Observe the equilibrium temperature. Calculate the bulk average temperature of the pellets based on the following equation:

$$(m_w)X(c_{pw})X(T_e-T_w)=(m_p)X(c_{pp})X(T_p-T_e)$$

wherein $m_w$ is the mass of the water, $c_{pw}$ is the heat capacity of the water, $m_p$ is the mass of the pellets, $c_{pp}$ is the heat capacity of the pellets, $T_e$ is the equilibrium temperature, and $T_w$ is the initial temperature of the water, and X represents multiplication. This equation can be solved to determine $T_p$, the bulk temperature of the pellets.

As will be appreciated by one of ordinary skill in the art, the bulk average temperature of the pellets, under various conditions, can be estimated with a reasonable degree of accuracy and precision based on standard heat transfer equations. The skilled artisan will be familiar with such calculations, including numerical and/or computer techniques for improved efficiency and accuracy.

For example, if one knows the heat transfer coefficient of the environment and the process conditions, then an estimate of the change in bulk average temperature of the particle with time can be obtained from the equations:

$$Q = m_p c_p \frac{dT_p}{dt} = hA(T_e - T_p)$$

$$\frac{dT_p}{dt} = \frac{hA}{m_p c_p}(T_e - T_p)$$

$$\frac{dT_p}{dt} = kT_e - kT_p$$

$$\text{where } k = \frac{hA}{m_p c_p}$$

$$\int_{T_{p0}}^{T_p} \frac{dT_p}{T_e - T_p} = \int_0^t k\, dt$$

$$-\operatorname{Ln}\left(\frac{T_e - T_p}{T_e - T_{p0}}\right) = kt$$

$$T_e - T_p = (T_e - T_{p0})(e^{-kt})$$

$$T_p = T_{p0}(e^{-kt}) + T_e(1 - e^{-kt})$$

This equation indicates that if the heat transfer constant, k, is known for a given system as well as the initial temperature of the particle and the temperature of the environment, then the bulk average temperature of the particle as a function of time can be calculated wherein $m_p$ is the mass of the pellet, $c_p$ is the heat capacity of the pellet, t is time, h is the heat transfer coefficient of the surface or gas to which the pellet is subjected, $T_e$ is the temperature of the surface or gas to which the pellet is subjected, and A is the area which is contacted or subjected to the heat source, whether a solid surface or a gas. For example, a hemispherical particle dropped on a steel belt may have a flat area A in touch with the belt, which area can be readily estimated as $(\pi(\text{radius}/2)^2$. Alternatively, an average value A of a sample of pellets can be physically measured for use in the above equations. These equations can be solved for $T_p$, the bulk average temperature of the pellet.

As mentioned above, the thermal shock can be imposed on PEN pellets so that the temperature gradient experienced by the pellets occurs in either direction, that is as a result of either heating or cooling. However, it is preferable that the pellets be crystallized by cooling from the melt. This avoids the need to reheat cooled particles and is thus more energy efficient.

In an integrated process for producing high molecular weight PEN, the low molecular weight PEN having the morphology described above may be further polymerized to higher molecular weight. The low molecular weight PEN may be melted and melt polymerized, but the crystalline PEN described herein is especially suitable for use in solid-state polymerization. Solid-state polymerization is well known to the artisan. See, for instance, F. Pilati in G. Allen, et al., Ed., *Comprehensive Polymer Science*, Vol. 5, p. 201–216 (Pergamon Press, Oxford 1989), which is hereby incorporated by reference. Solid-state polymerization is particularly useful for making higher molecular weight PENs. In general, particles of PEN are heated in an inert gas flow or vacuum to a temperature below the melting point. For example, a dry gas, usually nitrogen, may be passed, usually concurrently in continuous operation, around and over the particles. At the elevated temperature, transesterification and polycondensation reactions proceed, and the gas can be employed to carry away the volatile products (similar other methods, such as employing a vacuum, may be used for this purpose), thereby driving higher the PEN molecular weight.

In the past, a number of problems or difficulties have been associated with the solid-state polymerization of PEN. In particular, the particles to be polymerized usually have had to undergo an annealing or crystallization process, in order that they do no undergo partial melting and stick together when they are heated during solid-state polymerization. If, alternatively, the polymerization occurs at a relatively lower temperature to avoid sticking, this would increase the polymerization time, since the reactions that drive up the molecular weight proceed faster at higher temperatures.

Prior to crystallization, PEN also typically requires a devolatilization step, to rid the polymer of trapped gases that usually evolve when heating to a temperature near or at the crystallization temperature. These difficulties or problems tend to make the solid-state polymerization process more expensive to run. A conventional process for making high molecular weight PEN may involve six or more steps (transesterification, polycondensation, pellet crystallization, and solid-state polymerization) U.S. Pat. No. 5,449,701.

Advantageously and surprisingly, the PEN polymer with the crystalline morphology disclosed herein does not need devolatilization and/or further crystallization steps, and may be more directly polymerized. The need for a devolatilization step and a lengthy annealing step, which lengthens the overall process time, can thereby be avoided. Also, because the present process involves pellets of relatively lower molecular weight PEN, the conventionally separate transesterification and polycondensation steps may be combined in one embodiment of the present process. As a result, two separate catalysts, of which the first or transesterification catalyst is conventionally deactivated by a phosphorous compound before employing the second or polycondensation catalyst, may be avoided. Finally, because it is possible to combine the pellet formation and crystallization steps according to the present process, the above-mentioned six-step conventional process can be potentially reduced to as few as three basic steps (a first step, in which a low molecular weight PEN is formed, a second step involving combined pellet formation and crystallization, and a third step, for solid-state polymerization).

The process for obtaining higher molecular weight PEN according to the present process involves relatively less polymerization time in the melt, since the solid-state polymerization can start with PEN pellets having a lower DP or I.V. than in conventional processes. Since melt polymerization is usually run above 280° C. and solid-state polymerization is typically run at about 220° C. to 270° C., solid-state polymerization is less likely to produce degradation products than melt polymerization. Therefore, higher molecular weight PEN having lesser amounts of degradation products can be produced by the present process. This is an important advantage, because degradation products in PEN can have significant effects on the properties of the PEN. For example, degradation products in the PEN polymer can adversely affect the development of required film properties necessary for specific end use applications of biaxially oriented PEN film, such as dimensional stability during soldering.

In addition, the PEN particles produced according to the present process may, in some cases at least, be more resistant to attrition. This would usually be advantageous where PEN particles, in a solid-state polymerization apparatus, tend to wear against each other or the apparatus itself.

In any polymerization of low molecular weight PEN to higher molecular weight PEN, normal additives, such as transesterification and polycondensation catalysts and phosphorous compounds, may be present. These may have been added when the low molecular weight PEN was formed. Conventional catalysts and their relative activity are disclosed by S. S. Park et al., *Journal of Polymer Science: Part A: Polymer Chemistry*, Vol. 32, pp. 2873–2881 (1994).

Certain analytical procedures are used in this application and in the Examples. Aside from X-ray diffraction, which is described in detail above, these procedures are described below. References herein to these types of analyses, or their results, correspond to these exemplary procedures.

Inherent Viscosity. (I.V.)

A solvent is made by mixing one volume of trifluoroacetic acid and three volumes of methylene chloride (TFA/$CH_2Cl_2$ 25/75). PEN, in the amount of 0.25 g, is then weighed into a clean dry vial, and 25.0 ml of the solvent is added to it using a volumetric pipette. The vial is closed (to prevent evaporation of the solvent) and shaken for 30 min or until the PEN is dissolved. The solution is poured into the large tube of a #50 Cannon-Fenske viscometer, which is placed in a 30° C. water bath and allowed to equilibrate to that temperature. The drop times between the upper and lower marks are then measured in triplicate, and should agree with 0.4 sec. A similar measurement is made in the viscometer for the solvent alone. The I.V. is then calculated by the following equation:

$$I.V. = \frac{\ln\left(\frac{\text{solution time}}{\text{solvent time}}\right)}{\text{concentration}}$$

Molecular Weight Determination by $^1H$ NMR

The degree of polymerization (DP) or number average molecular weight of poly(ethylene naphthalate) oligomer was estimated by $^1H$ NMR spectroscopy (300 MHz) in d-hexafluoro-i-propanol solvent. The estimation was calculated by comparing the integrals of the aromatic naphthalate (multiplet, 7.8–8.8 ppm, 6H), the internal —$OCH_2CH_2O$— groups (singlet, 4.8 ppm, 4H) and the —$OCH_2CH_2OH$ end groups (doublet, 4.5 and 4.0 ppm, 4H). For example, a perfect dimer would have an integral ratio of 12H: 4H: 8H for aromatic: internal aliphatic: end group aliphatic. A perfect pentamer would have an integral ratio of 30H: 16H: 8H. Unlikely contributions from non-transesterified —$OCH_3$ end groups from the dimethylnaphthalate monomer were not considered in this analysis.

Melting Point

Melting point was determined by Differential Scanning Calorimetry (DSC) and all samples were analyzed using a TA Instruments DSC 910. The instrument was calibrated with indium consistent with the system documentation. The samples were analyzed as received, with no pre-grinding, using 5–10 mg±0.005 mg. The samples were sealed in aluminum pans, then heated from room temperature to 300° C. at 10° C./min in a nitrogen purged environment. Glass transition temperature, melting point temperature and heat of fusion calculations were done with the TA Instrument software. The reported DSC peak melting temperature is the corresponding temperature of the peak in the main melting endotherm.

In the following Examples, SSP means solid-state polymerization.

EXAMPLE 1

This Example illustrates a method of forming a PEN prepolymer and its thermal shock crystallization according to the present invention. Poly(ethylene 2,6(PEN) was melt polymerized from dimethyl 2,6-naphthalenedicarboxylate (NDC) and ethylene glycol (EG) according to the procedure outlined in Technical Bulletin GTSR-A, Amoco Chemical Company, Chicago, Ill., dated May 1, 1994. The preparation of PEN from dimethyl 2,6-naphthalenedicarboxylate (NDC) is similar to the preparation of PET from DMT. NDC was transesterified with ethylene glycol (EG) in the presence of a transesterification catalyst at atmospheric pressure and elevated temperatures to produce an oligomer with a degree of polymerization of 2–3, as determined by NMR. The system was evacuated to 1 mm Hg, producing a low molecular weight prepolymer with a degree of polymerization of 5–6 and an I.V. of 0.12. The low molecular weight prepolymer was heated in a melt indexer at 290° C. until the polymer dripped out of the orifice (1 mm in diameter) under its own weight. A hot plate covered with a 1.9 cm thick steel plate was placed 20 cm under the orifice of the melt indexer. The temperature was monitored by a thin-wire thermocouple kept in intimate contact with the steel plate. The molten polymer dripped onto the hot steel plate of which the surface temperature was 205° C. Crystallization was monitored by observing the clear amorphous drop turning into an opaque solid. Once it was opaque the metal surface was tipped at an angle to horizontal so the particles would slide off and cool to room temperature. The particles were shaped like spherical caps (semi-spherical particles in which the top surface was rounded and the lower surface was flat), approximately 7 mm in diameter and 1.8 mm thick. DSC analysis of the crystallized sample indicated no pre-melting endotherms. The peak melting temperature was 251° C. A wide angle x-ray diffraction (WAXD) pattern was collected for the sample (Sample 1 in Table 1 below) according to the method described above. The average apparent crystal size (ACS) was determined from the scattering of the $\overline{1}10$ crystallographic plane. The $ACS_{\overline{1}10}$ was 13.8 nm.

EXAMPLE 2

This Example illustrates that the novel crystalline morphology created by the thermal shock crystallization can be preserved when the low molecular weight prepolymer is solid state polymerized to higher molecular weight. About 30 of the particles (Sample 1 ) from Example 1 were solid-state polymerized at 220° C. for 23 hours to produce higher molecular weight PEN (Sample 2). The SSP batch unit consisted of a metal tube (23.5 mm diameter, 19 cm long) with a mesh screen on the bottom. Nitrogen, preheated to the set temperature, heated the outside of the tube and went up through the screen heating the particles. As shown in Table 1 below, the $ACS_{\overline{1}10}$ was 13.2 nm and the I.V. was 0.35.

COMPARATIVE EXAMPLES 3–5

Three samples of varying molecular weights were prepared by a conventional process to show that they do not have the novel crystalline morphology obtained by the present invention. Poly(ethylene 2,6-naphthalate) (PEN) was melt polymerized from dimethyl 2,6-naphthalenedicarboxylate (NDC) and ethylene glycol (EG) according to the procedure outlined in Technical Bulletin GTSR-A, Amoco Chemical Company, Chicago, Ill., dated May 1, 1994. The reaction of NDC with ethylene glycol (EG) was carried out in a transesterification step, in the presence of a transesterification catalyst, at atmospheric pressure and elevated temperature, followed by a polycondensation step accomplished at higher temperature and high vacuum in the presence of a polycondensation catalyst.

Sample C3 was polymerized to an I.V. of 0.58 dl/g and crystallized. Sample C4 was obtained by solid-state polymerizing the polymer of Sample C3 to an I.V. of 0.68 dl/g. Sample C5 was obtained by further solid-state polymerizing the polymer of Sample C3 to an I.V. of 0.76 dl/g. The average apparent crystallite size for each sample is listed in Table 1 below. Samples corresponding to comparative examples are indicated by a "C" prefix.

TABLE 1

| Sample | I.V. (dl/g) | $ACS_{\overline{1}10}$ (nm) |
|---|---|---|
| 1 | 0.12 | 13.8 |
| 2 | 0.35 | 13.2 |
| C3 | 0.58 | 7.1 |
| C4 | 0.68 | 8.3 |
| C5 | 0.76 | 7.9 |

What is claimed is:

1. A composition, comprising poly(ethylene 2,6-naphthalate) having an average apparent crystallite size of 10.0 nm or more, determined from $\overline{1}10$ reflection.

2. The composition as recited in claim 1 wherein said average apparent crystallite size is about 11.0 nm or more.

3. The composition as recited in claim 1 wherein said average apparent crystallite size is about 12.0 nm or more.

4. The composition as recited in claim 1 wherein the composition has a degree of polymerization of at least 4 and an inherent viscosity less than 2.0 dl/g.

5. The composition as recited in claim 1 wherein said modified poly(ethylene 2,6-naphthaiate) comprises up to 5 percent of other repeat units.

6. The composition as recited in claim 1 wherein said modified poly(ethylene 2,6-naphthalate) comprises repeat units derived from comonomers selected from the group consisting of isophthalic acid, triethylene glycol, 1,4-cyclohexane dimethanol, terephthalic acid, adipic acid, esters of the foregoing, diethylene glycol, and mixtures thereof.

7. Particles of modified or unmodified poly(ethylene 2,6-naphthalate) having an average apparent crystallite size of 10.0 nm or more, determined from the $\overline{1}10$ reflection.

8. The particles as in claim 7 having an average diameter of 0.05 cm to 2 cm.

9. The particles as recited in claim 7 or 8 wherein said average apparent crystallite size is about 11.0 nm or more.

10. The particles as recited in claim 7 or 8 wherein said average apparent crystallite size is about 12.0 nm or more.

11. The particles as recited in claim 7 or 8 consisting essentially of particles in an amount over 10 kg.

12. The particles as recited in claim 7 or 8 wherein said particles have an inherent viscosity of 0.05 to 2 dl/g.

13. The particles as recited in claim 7 or 8, wherein the particles are spherical, semi-spherical, cylindrical, or pancake-like in shape.

14. A process for crystallizing poly(ethylene 2,6-naphthalate), comprising cooling at a rate sufficient to cool a molten poly(ethylene 2,6-naphthalate), or heating at a sufficient rate to heat a glassy poly(ethylene 2,6-naphthalate), to a temperature of about 130° C. to about 250° C., to produce a crystalline poly(ethylene 2,6-naphthalate) having an average apparent crystallite size of 10.0 nm or more, as determined from the $\bar{1}10$ reflection, and having a degree of polymerization (DP) of at least about 4 and an inherent viscosity of less than about 0.4 dl/g.

15. The process as recited in claim 14 wherein said temperature is about 140° C. to about 230° C.

16. The process as recited in claim 14 wherein said average apparent crystallite size is about 11.0 nm or more as determined from the $\bar{1}10$ reflection, and said crystalline poly(ethylene 2,6-naphthalate).

17. The process as recited in claim 14 wherein crystallization is carried out in about 5 minutes or less.

18. The process as recited in claim 14 wherein said poly(ethylene 2,6-naphthalate) is produced in the form a particle.

19. The process as recited in claim 14 comprising the additional step of solid-state polymerization of said crystalline poly(ethylene 2,6-naphthalate).

20. A process for the solid-state polymerization of poly(ethylene 2,6-naphthalate), comprising heating particles of poly(ethylene 2,6-naphthalate), in an inert gas flow or vacuum, to above their $T_g$ but below their melting point, the improvement comprising starting with poly(ethylene 2,6-naphthalate) particles having an average apparent crystallite size of 10.0 nm or more, as determined from $\bar{1}10$ reflection, a degree of polymerization (DP) of at least about 4 and an inherent viscosity of less than about 0.4 dl/g, wherein solid state polymerization proceeds until the poly(ethylene 2,6-naphthalate) reaches an inherent viscosity of 0.5 to 2.0 dl/g.

21. The process as recited in claim 20 wherein said average apparent crystallite size is about 11.0 nm or more.

22. The process as recited in claim 20 wherein said average apparent crystallite size is about 12.0 nm or more.

23. A process for the solid-state polymerization of poly(ethylene 2,6-naphthalate), comprising:

(a) producing a prepolymer of PEN having a degree of polymerization of at least about 4 and an inherent viscosity of less than about 0.4 dl/g;

(b) forming the prepolymer of step (a) into pellets having an average apparent crystallite size of 10.0 nm or more, as determined from $\bar{1}10$ reflection;

(c) heating particles of poly(ethylene 2,6-naphthalate) in an inert gas flow or vacuum to above their $T_g$ but below their melting point, to produce a polymer having an inherent viscosity (I.V.) of 0.5 to 2.0 dl/g.

24. The process of claim 23, wherein the prepolymer of step (a) is produced by a transesterification reaction or by a transesterification reaction followed by a polycondensation reaction.

25. The process of claim 23, wherein the prepolymer of step (a) is formed into molten droplets and solidified into a composition having an average apparent crystallite size of 10.0 nm or more, as determined from the $\bar{1}10$ reflection.

26. The process of claim 23, wherein the pellets are not devolatilized and, after the pellets are formed in step (b), are not annealed for further crystallization prior to step (c).

* * * * *